Dec. 10, 1968     C. J. JOHNSON     3,415,497
COMBINED BLENDER AND SPATULA

Filed April 24, 1967     2 Sheets-Sheet 1

INVENTOR.
CLARENCE JAMES JOHNSON
BY
Bertha L. MacGregor
ATTORNEY

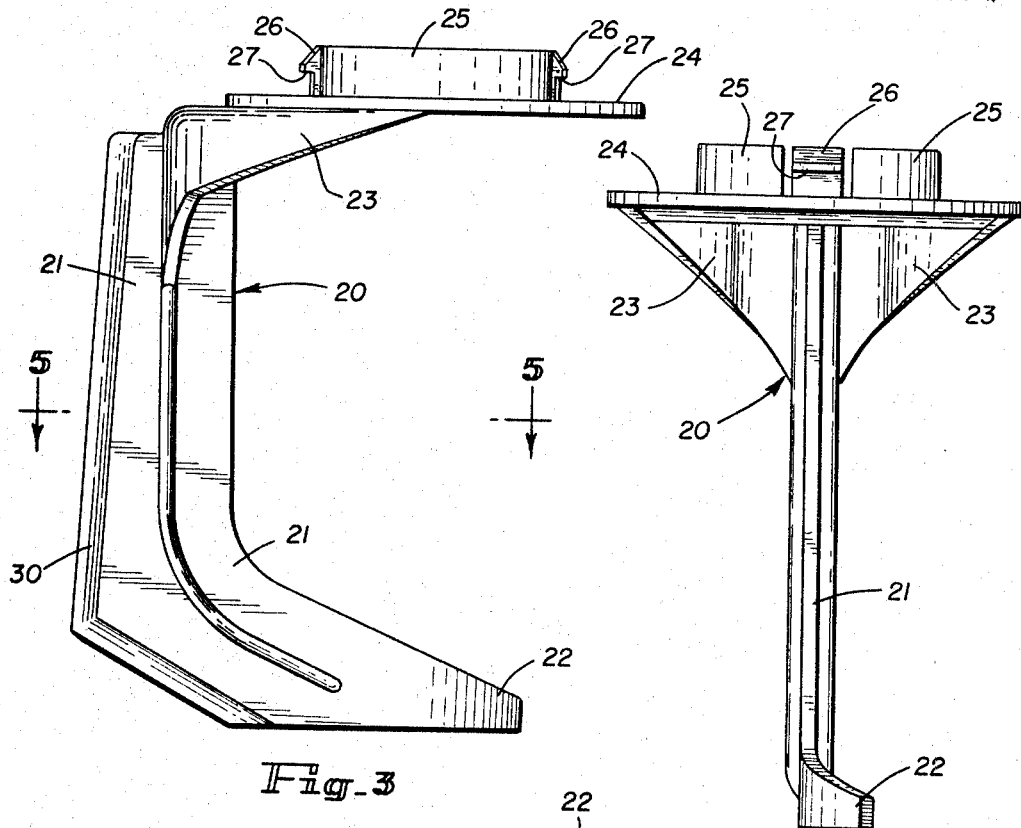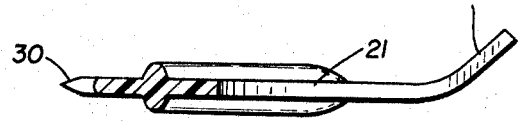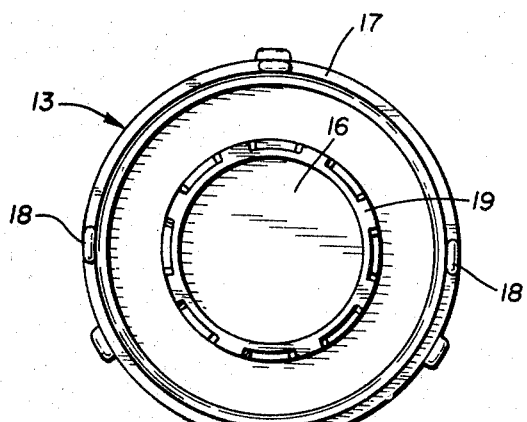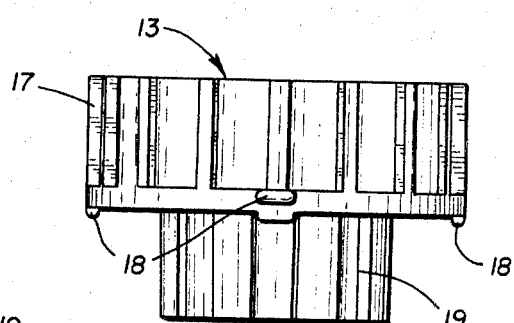

United States Patent Office 3,415,497
Patented Dec. 10, 1968

3,415,497
COMBINED BLENDER AND SPATULA
Clarence James Johnson, Racine, Wis., assignor to Scovill Manufacturing Company, Waterbury, Conn., a corporation of Connecticut
Filed Apr. 24, 1967, Ser. No. 632,989
10 Claims. (Cl. 259—118)

ABSTRACT OF THE DISCLOSURE

In combination with a blender having a removable container cover with a central opening and a cap closing the opening, a spatula which comprises a blade and snap-in fingers which extend through the central opening and engage the cover to detachably mount the spatula on the cover. The cap has a depending tapered splined portion which extends downwardly through the container cover opening and engages the spatula for rotating the spatula when the cap is manually rotated. The spatula has anti-friction means located between the spatula and cover which serve to reduce friction when the spatula is rotated and to position the spatula relatively to the cover. The splined sleeve portion of the cap locks the snap-in fingers in cover engaging position which prevents the spatula from becoming disengaged during blender operation.

---

This invention relates to the combination of a blender and a spatula detachably mounted on the cover of the blender container, and means for manually rotating the spatula within the container.

The main object of the invention is to provide means on the spatula for quickly and easily mounting it on the blender cover, and for removing it therefrom for cleaning the spatula.

Another object is to provide mechanism for rotating the spatula which includes means for closing a central opening in the cover customarily provided for use in filling the container. In the embodiment herein shown and described, the rotating mechanism comprises a cap which closes the opening in the container cover, is provided with a depending splined sleeve for engaging the spatula, and has a radially overhanging portion which extends over the container cover when the sleeve portion is in spatula engaging position.

The means on the spatula for mounting it on the blender cover preferably are snap-in fingers which engage the container cover through the central opening in the cover. When the cap with its splined sleeve are in spatula engaging position, the snap-in fingers are locked in position which prevents the spatula from becoming disengaged during blender operation.

The container can be filled through the central opening in the container cover and the registering opening in the spatula.

In the drawings:

FIG. 3 is an elevational side view of the spatula.

FIG. 4 is an elevational front view thereof.

FIG. 5 is a horizontal sectional view in the plane of the line 5—5 of FIG. 3.

FIG. 6 is an elevational side view of the blender cap.

FIG. 7 is a bottom view of the cap of FIG. 6.

Figure 1:
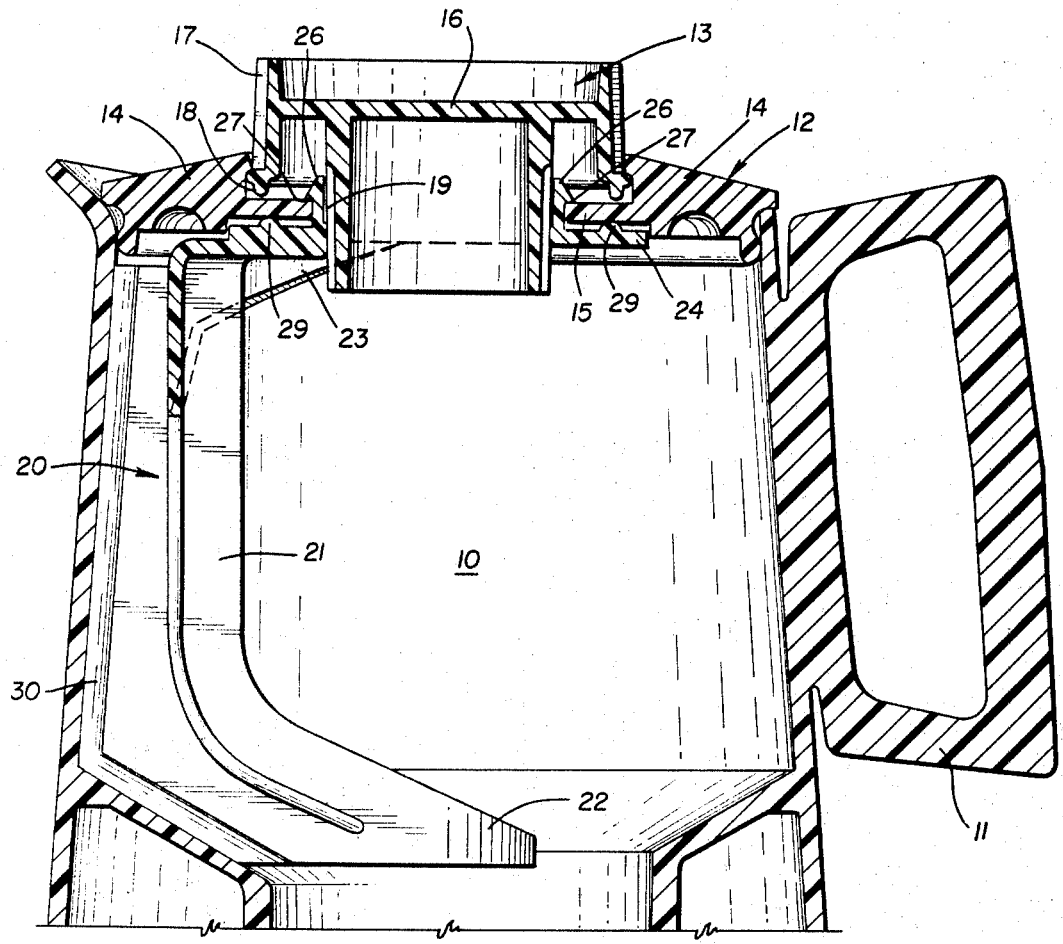
FIG. 1 is a vertical sectional view of a blender container having a cover and cap and a spatula mounted in the blender, embodying my invention, the lower portion of the container and conventional agitator means having been omitted.

In the preferred embodiment of the invention shown in the drawings, the container 10 with handle 11 has an open top which is closed by a removable cover 12 provided with a central opening which is closed by a cap 13. The cover 12 is made of vinyl, and the upper portion of the thicker part 14 may be soft vinyl of, for example, 50–60 durometer, and the lower portion including the inwardly extending flat member 15 may be hard vinyl.

The cap 13 comprises an upper horizontal plate member 16 integral with a knurled rim 17 having a lower edge 18 which is slightly spaced from the top of the cover portion 15 when the cap is in place as shown in FIG. 1. Depending from the horizontal member 16 of the cap is an externally splined sleeve 19 smaller in diameter than the central opening in the cover 12, and slightly tapered inwardly from top to bottom.

Figure 2:
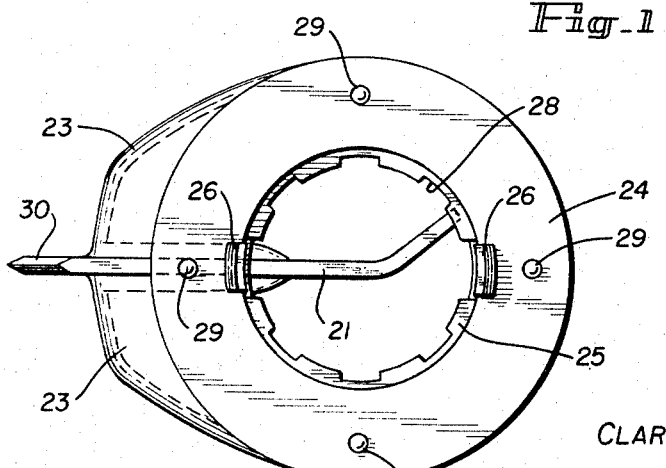
FIG. 2 is a top view of the spatula.

A spatula 20 detachably mounted in the container 10 comprises a blade 21 terminating at its lower end in a concavo-convex portion 22. The blade 21 widens symmetrically in its upper portion 23 and merges into a flat centrally open plate 24 from which rises a ring or collar 25, which is cut away at opposite sides to provide space for snap-in fingers 26 which extend upwardly from the plate 24. The fingers 26 are made of spring metal. At their free ends the fingers 26 have enlarged tips which provide cover engaging surfaces 27 for bearing on the portions 15 of the cover 12. The inner annular surface of the ring or collar 25 is tapered and splined as indicated at 28 in FIG. 2. The upper surface of the spatula plate 24 is provided with four hemi-spherical projections 29 which contact the portion 15 of the cover 12 when the snap-in fingers 26 of the spatula ring 25 engage the cover as shown in FIG. 1. The spherical projections 29 reduce friction during rotation of the spatula and position the spatula top surface 24 relatively to the container cover 12.

To mount the spatula 20 in the container 10, the spatula fingers 26 are snapped into engagement with the portion 15 of the container cover 12 through the central opening of the cover. Then the cover 12 is positioned in the open top of the container with the spatula depending therefrom into the container 10. In this position the substantially verical wiping edge 30 contacts the inner surface of the container. To rotate the spatula, the container cap 13 is inserted into the central opening in the cover 12 and into the splined ring 25 of the spatula with the plined surfaces 19 and 28 engaging each other. Manual rotation of the cap by turning the knurled portion 17 rotates the spatula. When the splined sleeves 19 of the cap 13 is in its intended position as shown in FIG. 1, the snap-in fingers 26 are locked in the position in which the surfaces 27 bear on the cover portion 15 and prevent the spatula from becoming disengaged during the blender operation.

After use, the blender cap 13 is removed from the spatula, and the container cover and spatula are removed from the container 10. By depressing the snap-in fingers 26 toward each other, the spatula is released from the cover 12 for cleaning.

In describing the invention, reference has been made to a particular example embodying the same, but I wish it to be understood that the invention is not limited to the construction shown in the drawing and that various changes may be made in the construction and general arrangement of parts without departing from the invention.

I claim:
1. A combined blender and spatula comprising
   (a) an open top container,
   (b) a removable container cover having an opening therethrough,
   (c) a cap for closing the cover opening and rotatable therein,
   (d) a spatula in the container having a pair of snap-in fingers detachably engaging the container cover, and

(e) cooperating means on the cap and spatula for rotating the spatula when the cap is manually rotated.

2. The mechanism defined by claim 1, in which the cap comprises an externally splined sleeve having an upper portion which overhangs the container cover when the cap is in cover closing position.

3. The mechanism defined by claim 1, in which the spatula comprises a container wiping blade, a horizontal support with central opening to which the blade is attached, and a ring surrounding the support opening, said ring being cut away at opposite sides to accommodate the snap-in fingers.

4. The mechanism defined by claim 3, in which the cooperating means on the cap and spatula for rotating the spatula comprise engaging splined surfaces on the spatula ring and on the cap.

5. The mechanism defined by claim 3, in which the snap-in fingers extend upwardly from the spatula horizontal support through the cover opening and are locked in cover-engaging positions when the cap is in cover closing position.

6. A combined blender and spatula comprising
 (a) an open top container,
 (b) a removable container cover having an opening therethrough,
 (c) a cap for closing the cover opening and rotatable therein,
 (d) a spatula in the container having resilient means detachably engaging the container cover, and
 (e) cooperating means on the cap and spatula for rotating the spatula when the cap is manually rotated.

7. The mechanism defined by claim 6, in which the resilient means on the spatula extend upwardly in the cover opening and are locked in cover-engaging positions when the cap is in cover closing position.

8. The mechanism defined by claim 6, in which the spatula comprises a container wiping blade, a horizontal support with central opening to which the blade is attached, and a ring surrounding the support opening.

9. The mechanism defined by claim 8, in which the cooperating means on the cap and spatula for rotating the spatula comprise tapered splined surfaces on the spatula ring and on the cap.

10. The mechanism defined by claim 6 which includes antifriction means located between the spatula and the cover which position the spatula relatively to the cover.

References Cited

UNITED STATES PATENTS

| | | | |
|---|---|---|---|
| 2,733,052 | 1/1956 | Luther | 259—122 |
| 2,793,012 | 5/1957 | Wolf | 259—122 |
| 3,187,366 | 6/1965 | Fant | 259—1 XR |

WILLIAM I. PRICE, *Primary Examiner.*

U.S. Cl. X.R.

15—236